United States Patent
Fowlow

(12) 
(10) Patent No.: US 6,260,078 B1
(45) Date of Patent: *Jul. 10, 2001

(54) USING A DISTRIBUTED OBJECT SYSTEM TO FIND AND DOWNLOAD JAVA-BASED APPLICATIONS

(75) Inventor: Brad G. Fowlow, Redwood City, CA (US)

(73) Assignee: Sun Microsystems, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/675,733

(22) Filed: Jul. 3, 1996

(51) Int. Cl.[7] .................................................. G06F 15/163
(52) U.S. Cl. .............................. 709/332; 709/316; 717/11
(58) Field of Search ..................... 395/680, 682, 395/683; 709/300, 302, 303, 315, 332, 316; 717/10, 11

(56) References Cited

U.S. PATENT DOCUMENTS

| | | | |
|---|---|---|---|
| 5,630,066 | * 5/1997 | Gosling | 709/221 |
| 5,724,556 | * 3/1998 | Souder et al. | 703/2 |
| 5,737,607 | * 4/1998 | Hamilton et al. | 717/1 |
| 5,854,936 | * 12/1998 | Pickett | 717/10 |
| 5,872,973 | * 2/1999 | Mitchell et al. | 709/332 |
| 6,009,464 | * 12/1999 | Hamilton et al. | 709/219 |

OTHER PUBLICATIONS

The Common Object Request Broker Architecture and Specification; Rev. 2.0; pp. 13–1 through 13–26, Jul. 1995.*
Author van Hoff, Java and Internet Programming, Aug. 1995, Dr. Dobb's Journal.

George Gilder, The Coming Software Shift Telecosm, Aug. 28, 1995, Forbes ASAP.

* cited by examiner

*Primary Examiner*—Kenneth R. Coulter
(74) *Attorney, Agent, or Firm*—Beyer Weaver & Thomas, LLP

(57) ABSTRACT

A client enabled to load and run Java applets in a distributed object computing system retrieves needed Java classes in a location-independent manner from various class servers in the system. Initially, the client queries a naming service of the distributed object computing system to determine the class server that contains the base class needed. A connection through an object request broker is made from the client to the class server. The client then requests the code for the base class from the class server by using the object request broker. The class server retrieves the code by either reading a file from its own local file set, or if the code is not local, queries the naming service for another class server that has access to the code for the base class. This process of finding a class server and determining if the code is local may be recursive as classes may be moved or renamed. The class server then returns this code to the client by way of the object request broker. The client determines whether the returned code contains any unresolved classes, i.e., classes that are used but not yet defined or loaded. The client requests code for any unresolved class in a manner as above for the base class. The client incorporates Java software to run the applets and ORB binding software to enable the software to make calls to the object request broker. A network class loader enables the client to load and resolve classes over a distributed object system.

30 Claims, 6 Drawing Sheets

USING A DISTRIBUTED OBJECT SYSTEM TO FIND AND DOWNLOAD JAVA-BASED APPLICATIONS

FIELD OF THE INVENTION

The present invention relates generally to acquiring application program code within a computer system. More specifically, the present invention relates to acquiring Java-based applications within a distributed object system.

BACKGROUND OF THE INVENTION

With the increasing popularity of the Internet, there has been a corresponding increase in the demand to be able to transfer and to view information via the Internet. In general, the Internet is used to communicate with others via electronic mail and also to view information within an international network of computers. One aspect of the Internet is the World Wide Web (the "Web"). Among other uses, the Web is used to access Web sites (or Web pages) of a particular company, organization or person. These Web sites contain information and are available for viewing as part of the World Wide Web. When a user accesses a Web site, typically information from that Web site is downloaded to the user's computer. This information includes graphics, windows, text, photographs, sound, video and other information suitable for passing over a computer network.

Typically, software known as a "Web browser" is used to browse through the Web to search for particular Web sites and information, to connect to a particular Web site, and finally to download the information from that Web site onto the user's computer. A wide variety of Web browsers are available. By way of example, two popular Web browsers are "Netscape" and "Mosaic". When using such a browser to download information from a Web site, the information often appears within a window on the screen of the user's computer. And it is then often desirable to also load executable program code that may then be executed on the user's computer within the window or a smaller sub-window. One technique available for loading and executing program code on a user's computer uses the Java programming language available from Sun Microsystems, Inc., of Mountain View, Calif.

Java is a programming language that also includes an interpreter as a run-time environment. It is an object-oriented programming language that is designed to support applications on networks. Java applications that execute within the run-time environment are known as applets. A Java applet contains compiled code that is portable and may be executed on any computer running the Java interpreter. Structurally, each applet is a collection of classes that may be stored on a computer in a file system. Because Java is a dynamic language these classes may be loaded as they are needed from across a network. There may be one class per file, or there may be many classes in a given file. Java may be running on a single computer or on a number of computers within a network. And although Java may be used in conjunction with a Web browser, Java may also be used as part of any computer system or network. A description of the Java language may be found in "Java in a Nutshell" by David Flanagan, available from O'Reilly & Associates, Sebastopol, Calif., 1996.

Before the popularity of the Web, a Java interpreter loaded applets for execution that were present on the local computer. In Java, typically a base class desired is loaded first, and this base class indicates further classes that are used by the base class and thus need to be loaded as well. Classes that are needed but not yet loaded are termed "unresolved", whereas classes that are needed and that are loaded (or defined) are termed "resolved." So, before the use of the Web, the classes of a particular applet were stored in a collection of files in a file system of the local computer. The Java interpreter running on the local computer would then access the local file system and retrieve the files corresponding to the classes it needed. Unfortunately, Java would then only be able to retrieve applets available from the local file system because only the local file system is known to the Java interpreter. Also, these classes had to be specified by giving a fixed file name.

With the advent of browsers available for the Web, however, Java is able to find and download applets from remote sites; however, this acquisition of applets is still limited. In these situations, a browser typically incorporates a Java interpreter in order to execute applets that are downloaded. A Java applet is downloaded by first identifying the name of the base class desired. Once that base class is identified and loaded, the other classes used by that base class are then retrieved and loaded into the Java interpreter. Because a browser typically uses the hypertext transfer or "http" protocol, the location of these Java classes within the computer network are identified using a Universal Resource Locator (URL) address. A URL address connects machines together. It provides a machine name plus a path to a file on that machine. Thus, through the URL address, the individual files that contain the Java classes may be identified within a computer network. The http server running on the identified machine reads these files and then sends the classes (in the form of executable bytes) back to the requesting browser for execution.

An example of how this process works may be illustrated as follows. Typically, Web pages are described in a hypertext markup language (HTML) that defines how the Web page will appear and perform when downloaded to the user's computer. In the course of using a Web browser such as Netscape for downloading such a Web page, the user may encounter a Java applet embedded in the HTML that indicates a base class to load. In other words, the HTML page data that a user may acquire through Netscape contains references to applet classes that may be used to execute small programs in parts of the page. Thus, Netscape would be directed to locate and download the code for the applet to run in the frame that the page defines. This code is found by reference to a specific URL address that identifies a particular computer.

The drawback with either defining Java classes as being contained in files available on a local file system or as being contained in files that are accessible through a URL address is that these file names are "hard-wired". In other words, the user who desires an applet must know the actual name of the file that corresponds to a physical machine somewhere. It may be difficult to obtain or to update this name. For example, if the Java applet or any of its classes are moved, then these file names must be changed. This is an awkward and undesirable situation in the context of the Internet where applets and classes might be located in different locations and where it may be desirable to move these classes. For example, an applet might be used in the context of a Web browser where the applet performs the function of displaying satellite weather information for a particular Web site. In the course of displaying the information, the applet may need to find and download various classes within the network. It would be undesirable if one class could not be found either because its hard-wired file path name had changed or if the class name had changed. Such a situation might result in the weather display halting while only halfway done. Also, if the particular computer is down, the needed classes are inaccessible even if those classes are available elsewhere in the network.

Especially within a distributed object system, the current model for finding and downloading Java classes according to "hard-wired" file names breaks down. For example, the beauty of a distributed object system is that references may be made to objects (such as classes or files) without needing to know where exactly those objects are located. Also, a proper distributed object system allows those objects to be located anywhere within the system yet still allow a requesting entity to find the objects that it needs. Thus, current schemes for finding and downloading Java classes according to a "hard-wired" file name are not suitable within a distributed object system. Accordingly, it would be desirable to have a technique for finding and downloading Java-based applications within a distributed object system. Such a technique would allow a requesting entity to query one source for an applet yet be able to find and download all classes needed by that applet no matter where they exist within the distributed object system and without having to give an exact host machine and file name for these classes.

SUMMARY OF THE INVENTION

Embodiments of the present invention relate to apparatus and methods used to acquire applet execution code within a distributed object computing system. The distributed object computing system includes clients, applet servers and an object request broker arranged to facilitate communication between the clients and the applet servers. In a method aspect, initially a client queries the object request broker to determine if there is an applet server available within the system that may be used to obtain particular applet execution code. In another step, the client requests a portion of this applet execution code from a found applet server by using the object request broker. Once requested, the applet server retrieves a portion of the desired applet execution code. The applet server is then able to return this portion of applet execution code to the client by way of the object request broker.

In a related aspect, the client incorporates applet software to enable the client to run the applet execution code. The client may also have loaded specialized ORB binding software to enable the applet software to make calls to the object request broker, and may have a network class loader to enable the client to load portions of the applet code and to resolve portions of the code. The applet software may be a version of the Java programming language and run-time environment that allows the client to run Java applets acquired over the distributed system. These Java applets may be stored as Java classes available from various class servers in the system. In one aspect, the portions of applet execution code are Java classes. Also, the distributed object system may include a naming service used by a client to locate the applet server for a particular class.

In one embodiment, an applet server retrieves the requested applet execution code by determining whether a portion of the applet execution code is found within its local file set. If the portion is present, then the applet server reads a file in order retrieve the code and then returns it to the requesting client. If the portion is not present in the file set, then the applet server queries the naming service to determine if there is another applet server within the distributed object computing system that is associated with the desired portion. If this second applet server is found, it may perform this determination process in a recursive manner until the desired portion of applet execution code is found.

In another aspect, once the portion of applet execution code is returned to the client, the client determines whether the portion of code contains any unresolved references to any other portion of the applet execution code. These unresolved references may take the form of classes used by loaded execution code that are not yet defined or loaded. If there are unresolved references, the client requests additional applet execution code corresponding to these unresolved references from the first applet server found. In turn, this applet server either returns the code itself, or queries the naming service for another applet server with access to the code. In this fashion, all applet execution code needed is loaded into the client for execution.

BRIEF DESCRIPTION OF THE DRAWINGS

The invention, together with further advantages thereof, may best be understood by reference to the following description taken in conjunction with the accompanying drawings in which:

FIG. 1b shows the flow of a request from a client to a servant object within the distributed object system of FIG. 1a.

DETAILED DESCRIPTION OF THE INVENTION

Overview

Figure 1A:
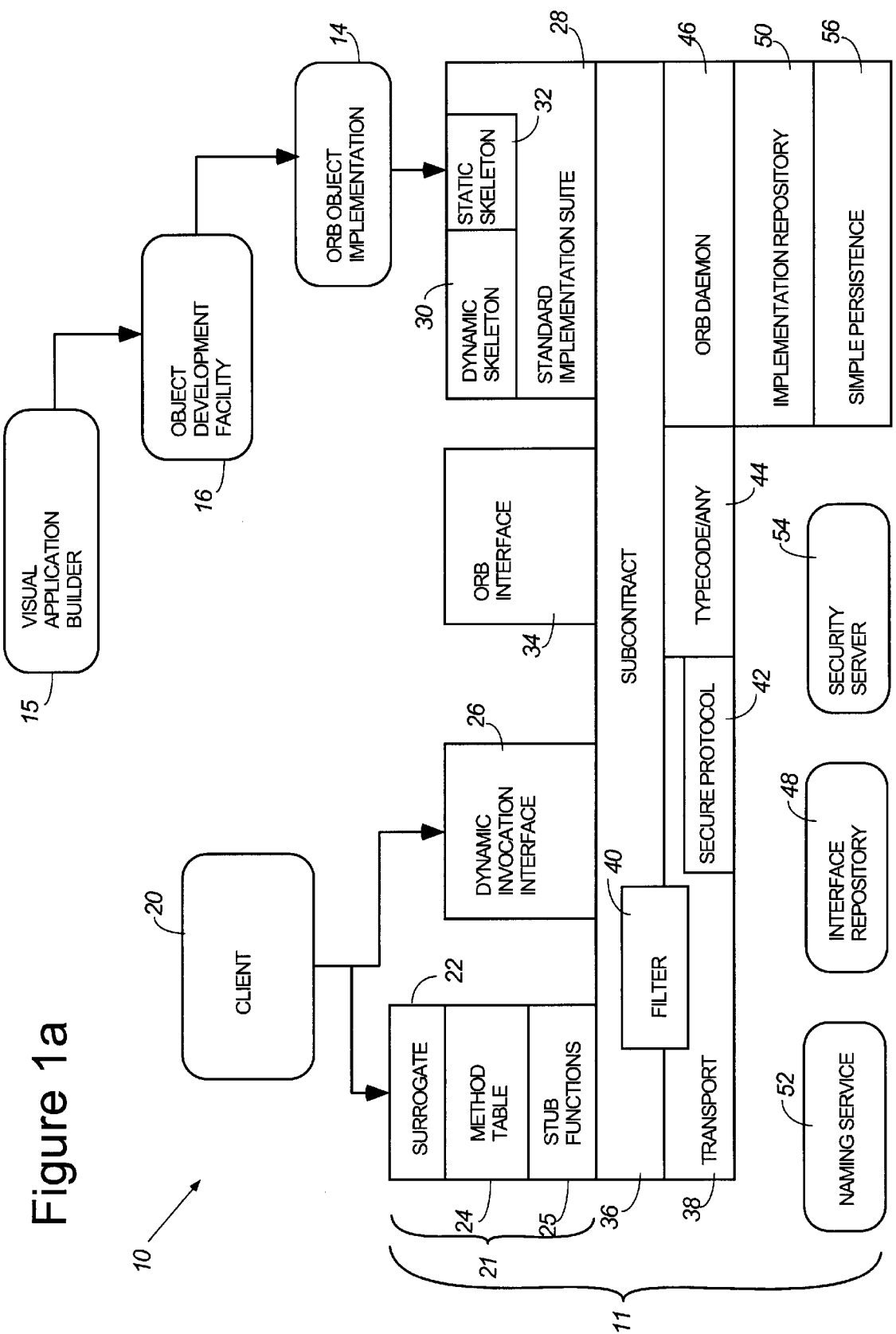
FIG. 1a illustrates a distributed object system having an object request broker (ORB) portion, object development facilities and client and server objects according to one embodiment of the present invention.
Figure 1B:
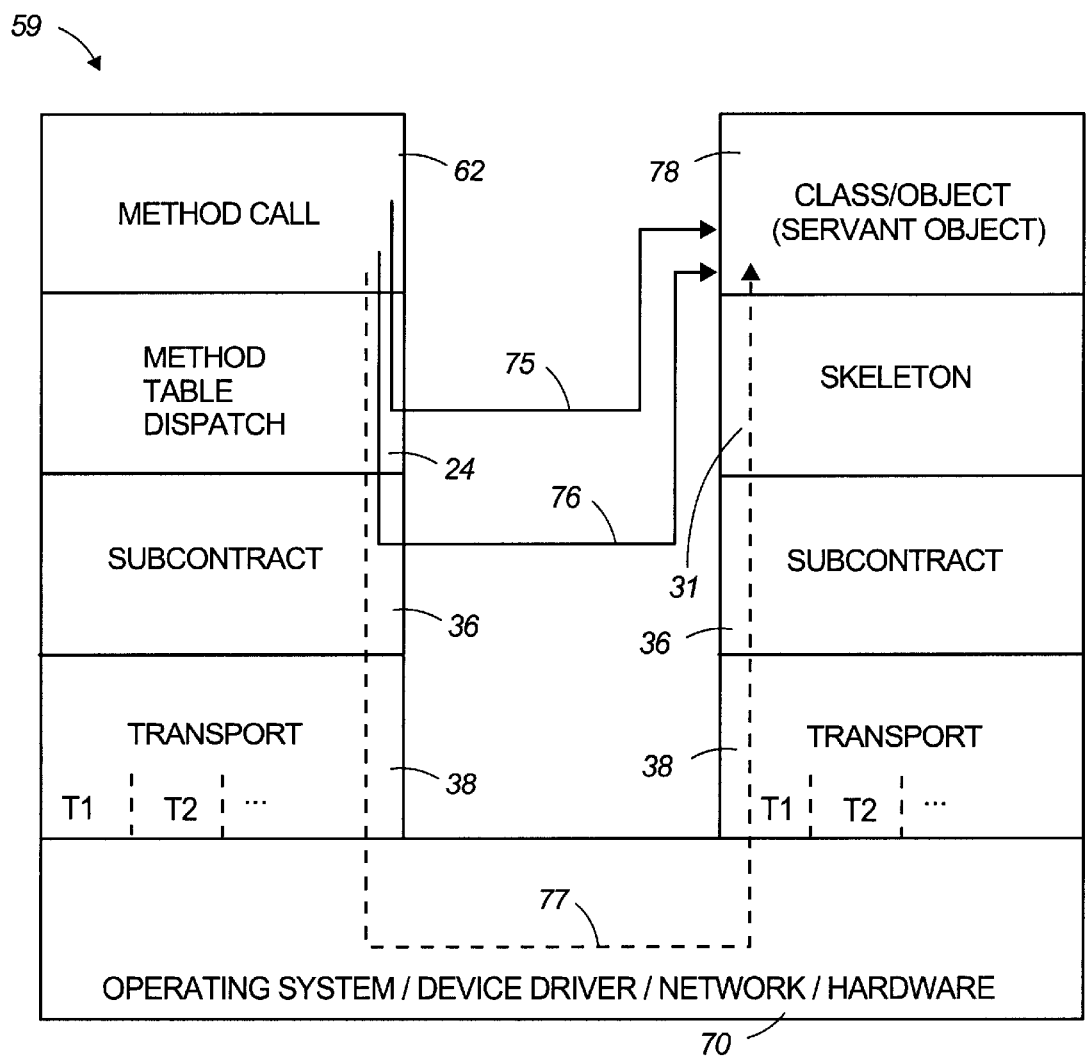
Figure 1C:
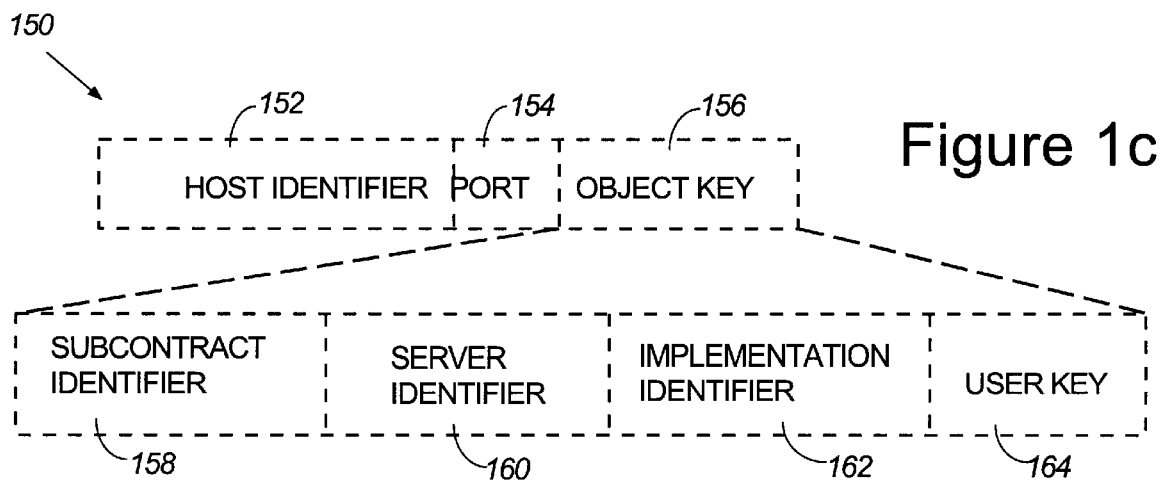
FIG. 1c is an embodiment of an object reference suitable for use within the distributed object system of FIGS. 1a and 1b.

The present invention is directed toward distributed object systems and will be described with reference to several preferred embodiments as illustrated in the accompanying drawings. The invention may be practiced within the context of any suitable distributed object system, including those defined under CORBA or any other suitable specification. However, for purposes of illustration, an embodiment of the present invention will be described primarily within the context of an Object Request Broker (ORB) implemented under the CORBA specification from the Object Management Group (OMG), Revision 2.0, dated July 1995, which is incorporated herein by reference. FIG. 1a diagrammatically illustrates the overall architecture of a representative distributed object system suitable for implementing an embodiment of the present invention. FIG. 1b diagrammatically illustrates some possible flow paths that a request from a client to a servant object may follow within such an architecture that includes a three-level dispatch mechanism. FIG. 1c shows one object reference data structure that may be used by a client to refer to a servant object.

A distributed object system 10 typically includes an Object Request Broker (ORB) 11 as is symbolically illustrated in FIG. 1a. ORB 11 provides all of the location and transport mechanisms and facilities necessary to deliver a call from a client to a servant (target object) and to return a response to the client, as will be discussed below with reference to FIG. 1b. The client and servant may be located in the same process, in different processes on the same machine, or on completely different machines. For the purposes of this discussion, client 20 may be any code that invokes an operation on a distributed object and thus may or may not take the form of a distributed object or a process. A distributed object may have a wide variety of representations. By way of example, the distributed object may be a C++ object that has been provided by an application developer. Alternatively, an implementation for a distributed object may be developed within a visual application builder 15. This visual application builder allows a developer to visually select existing object types from a catalog and graphically connect the services provided by one object to the services needed by another (attributes, arguments, results etc.) in order to create a new implementation for an object.

An object development facility 16 may be used to simplify the creation and the installation of distributed objects. It is used to "wrap" or encapsulate developer objects in distributed object code. As such, object development facility 16 may be used to transform a developer object into an ORB object implementation 14. In this example, ORB object implementation 14 is presented as a server as shown by its location in the diagram. A developer uses an interface definition language to define an interface for an ORB object, provides a developer object implementation that implements that object's behavior, and then uses the object development facility 16 in order to produce an ORB object implementation 14. At run time, an instance of this ORB object (a servant object) is created that will utilize this ORB object implementation 14. It should be appreciated that the object development facility may also be used to create objects that take the role of clients at some point.

Client 20 communicates with a servant by way of a stub 21, a subcontract layer 36, possibly a filter 40, and a transport layer 38. Stub 21 includes a surrogate 22, a method table 24 and stub functions 25. Client 20 communicates initially with surrogate 22 that appears to the client as the servant object. Alternatively, client 20 may communicate directly with the servant object through a dynamic invocation interface (DII) 26 instead of through surrogate 22, method table 24 and stub functions 25. Dynamic invocation interface 26 is used to enable clients to construct dynamic requests. One procedure by which a client may make a call to a servant utilizing the above layers is described in more detail below with reference to FIG. 1b.

Subcontract layer 36 provides the functionality required by an object in order to utilize subcontracts to implement various services (or features or object mechanisms) named by a particular subcontract, as described in greater detail in U.S. patent application Ser. No. 08/554,794, filed Nov. 7, 1995, now U.S. Pat. No. 5,577,251. A subcontract identifies a quality of service provided by the distributed object system that may be utilized by an individual object. For example, a subcontract may identify that the feature of security is to be used for a particular object. A technique by which a particular subcontract may be associated dynamically at run time with a servant object is described in U.S. patent application Ser. No. 08/670,682, now U.S. Pat. No. 6,044,224 filed Jun. 26, 1996. Filter 40, if being used, may perform a variety of tasks, such as compression, encryption, tracing, or debugging, that are to be applied to communications to and from an object.

Transport layer 38 operates to marshal, unmarshal and physically transport information to and from a servant that typically does not share the same process as a client. Mechanisms for marshaling and unmarshaling inter-object communications are described in U.S. patent application Ser. No. 08/673,181, now U.S. Pat. No. 6,032,199 filed Jun. 26, 1996. A technique for marshaling/unmarshaling an object reference is described in U.S. patent application Ser. No. 08/670,681, now U.S. Pat. No. 6,044,409 filed Jun. 26, 1996.

A standard implementation suite 28 (or object adapter) represents a set of subcontracts that interact with ORB objects 14 in identical ways, as for example object key management. One such implementation suite is described in U.S. patent application Ser. No. 08/699,782, now U.S. Pat. No. 5,991,823 filed Jun. 26, 1996. It should be noted that a subcontract may belong to multiple implementation suites. Also, implementation suites may utilize different subcontracts. A skeleton, that may take the form of either static skeleton 32 or dynamic skeleton 30, is used to transform requests into a format required by a servant object 78 (as will be explained in more detail below with reference to FIG. 1b). Thus, skeletons 30 and 32 call an appropriate servant object 78. Static skeleton 32 is used to call interface-specific object implementations 14, while dynamic skeleton 30 is used generically when interface-specific objects are not available. An ORB interface 34 is the interface that goes directly to the ORB that is the same for all ORBs and does not depend upon an object's interface or object adapter.

An ORB daemon 46 is responsible for ensuring that object servers are active when invoked by clients. A technique for starting object servers is disclosed in U.S. patent application Ser. No. 08/408,645 filed Mar. 22, 1995, now abandoned which is hereby incorporated by reference.

Secure Protocol 42 is a secure interoperability protocol that secures the internet inter-ORB protocol and helps to transmit information through transport layer 38 in a secure fashion. This may mean integrity protection, confidentiality, etc. The internet inter-ORB protocol is a protocol that typically communicates between processes on different machines. However, in some cases, the internet inter-ORB protocol may communicate between processes on the same machine. The security server 54 is a security administration server that secures the services that are used between processes on different computers.

Typecode/Any module 44 implements "Typecode" and "Any" objects. Typecode describes an Interface Definition Language (IDL) data type, allowing type descriptions to be transmitted between clients and servers. An instance of an IDL data type may be encapsulated by an Any object. An Any object refers to typecode of the encapsulated data, and a generic encoding of the data.

An implementation repository 50 is used to store information relating to object servers. Specifically, implementation repository 50 stores the information needed to start a server process. For example, implementation repository 50 stores information such as the location of the server program, any arguments to the program, and any environment variables to pass to the program, etc.

Simple persistence 56 uses an Interface Definition Language (IDL)-defined type and the output from running that IDL type through the IDL compiler, together with a portion of additional code so that an IDL-defined type can be read from, and written to, disk. A naming service 52 is used to name ORB objects. A client may use naming service 52 to find a desired object by name. Naming service 52 returns an object reference, that in turn may be used to send requests to that object. An Interface Repository 48 (IFR) knows about all interfaces for all objects within the distributed object system.

A request made by a client using a method table ("m-table") dispatch will pass through a variety of the aforementioned layers of the architecture on its way to the servant as diagrammatically illustrated in FIG. 1b. The request is initiated by a client and may take any suitable form. The form of the request will depend to a large extent upon the nature of the programming language used to create the client. By way of example, if the client is written in the C++ language, the request may take the form of a C++ method call 62. The call is made to a designated object reference taking the form of a surrogate. The surrogate includes methods that comply with the object's interface.

As will be appreciated by those skilled in the art, the object reference used at different locations within a distributed object system may vary significantly in appearance. In the embodiment described, the client side object reference is a dual pointer (referred to herein as a "fat pointer"). A fat pointer contains two distinct pointers. A first pointer points to a client representation ("client rep") associated with the referenced object. A second pointer points to a method table of the method table dispatch 24 that is associated with the referenced object. A client representation is an object that has methods that support invocation as well as CORBA defined "pseudo" object reference operations. These operations include, but are not limited to, a "duplicate" method, a "release" method, a "narrow" method, a "hash" method, and an "is equivalent" method.

After the client has initiated a call, the call is processed using a method table dispatch mechanism 24. Such a technique is disclosed in U.S. patent application Ser. No. 08/307,929 filed Sep. 19, 1994, now abandoned and is hereby incorporated by reference.

The method table dispatch mechanism uses a method table that contains a list of pointers to stub functions 25, one of which is associated with the method to be invoked. Stub functions 25 receive a function or procedure call in the "native" language of the client process, then use either a subcontract layer 36 or a native call to eventually call the corresponding servant object. The native language may be any suitable language, as for example a language such as C++.

Method table dispatch 24 determines the appropriate one of the stub functions 25 to process the method call, and then pairs the method call with the appropriate stub function. In the event that the client making the method call is in the same process as the servant object, a local stub function is called. The local stub function sends the method call directly to servant object 78. A technique for routing calls within a local process is described in U.S. patent application Ser. No. 08/670,684 filed Jun. 26, 1996, now at the Board of Appeal. Alternatively, if the servant object is in a different process, i.e. a remote process, a remote stub function is called. The remote stub function invokes the client representation, that delivers the invocation to servant object 78.

Subcontracts implemented by subcontract layer 36 are logic modules that provide control of the basic mechanisms of object invocation and argument passing that are important in distributed object systems. A subcontract implemented by subcontract layer 36 determines a specific quality of service for use by an object. A subcontract is uniquely identified by a subcontract identifier that is typically embedded in an object reference. A quality of service is a set of service properties. Among possible service properties that are selectable are qualities relating to server activation, security, transactions, filterability, and clean shut-down. Subcontracts are configured such that certain qualities of service are available. With predetermined qualities of service, the overhead associated with processing individual service properties is reduced. Realistically, only "reasonable" or commonly used combinations of service properties are supported with subcontracts. However, subcontracts may be created to meet the specific requirements of a given distributed object system.

The identification of an appropriate subcontract in subcontract layer 36 may be thought of as the identification of a desired function that is unique to that subcontract. For example, a marshal function or an unmarshal function is defined for each subcontract. A subcontract marshal function is used by a stub to marshal an object reference so that it may be transmitted to another address space, or domain. The object reference is typically processed by a transport mechanism in transport layer 38.

A transport mechanism such as T1, T2, etc., that is a part of the transport layer 38 is used to marshal and physically transport information to and from servant objects. Information, i.e. the object reference or the request, is converted into protocols appropriate to a given domain. By way of example, protocols may include, but are not limited to, Ethernet protocols and general inter-ORB protocols (GIOPs). In some uncommon cases, protocols may even entail the use of electronic mail to transmit instructions to be implemented on a server. After information is marshaled, the transport mechanism then transports information through any combination of an operating system, a device driver, or a network, that are all a part of hardware 70 used by the client side of a distributed object system.

While transport mechanisms require a conversion of information into a protocol appropriate to a given domain, some transport mechanisms do not require the encoding of information for different domains. One transport mechanism that does not require a conversion of information into a protocol appropriate to a domain other than the one on information originates is termed a "door". Doors are essentially gateways between two different processes on the same host. The use of doors eliminates the need for a conversion of information into a canonical implementation in transport layer 38, as there is no need to encode information into a protocol that may be used by a different machine by virtue of the fact that information is remaining on the same host and therefore does not require a change of domain. Hence, information may simply be "flattened out," or marshaled into a stream that is not encoded for use by a different machine, and passed between the two processes on the host.

Once information is transported through hardware 70 used by the client side, the information is then transported to hardware 70 on the server side of a distributed object system. Once information is routed through hardware 70, the server side of a distributed object system invokes a transport mechanism such as T1, T2 etc. to receive information on an end point that is a part of transport layer 38. In the event that an end point is not created by transport layer 38, transport layer 38 provides the functionality needed for the end point to be created by subcontract layer 36. By way of example, a dedicated end point is typically created by subcontract layer 36, while cluster end points, which typically include network and TCP/IP end points, are typically created by transport layer 38. Regardless of whether end points are created by subcontract layer 36 or transport layer 38, end points "live in," i.e. are a part of, transport layer 38. End points are essentially ports that receive information from a different domain. After an end point in transport layer 38 receives information transported from a different domain, the end point then dispatches the information from transport layer 38 to subcontract layer 36. Subcontract layer 36 then dispatches the information to the skeleton and the servant. Such a technique for performing this three-level dispatch is described in U.S. patent application Ser. No. 08/670,700 filed Jun. 26, 1996, still pending.

Subcontract layer 36 provides the functionality to unmarshal at least some of the information it has received. That is, subcontract layer 36 unmarshals at least part of the request. Then, the request is dispatched to a skeleton 31 that transforms the request into an implementation specific format required by servant object 78. The skeleton 31 may either be a static skeleton 32 or a dynamic skeleton 30 as described above.

In general, a remote request is routed through the client side and the server side as described above. The method call 62 is received, method table dispatch layer 24 is used to identify an appropriate subcontract prior to the selection of a transport mechanism in transport layer 38 that marshals the request and prepares it for transport to another domain. Through hardware 70, the marshaled request is transported to the server side where it is received on an end point that is a part of transport layer 38. An appropriate end point receives information transported across a wire, and information is dispatched from transport layer 38 to subcontract layer 36, that provides the functionality to at least partially unmarshal the information it has received. The subcontract layer then dispatches the request to skeleton 31 that transforms the request into a specific format required by servant object 78. This path is shown by arrow 77, and is the path that may be taken by both remote and local requests.

However, if a client and a server are in a local process, i.e. both the client and the server are in the same process, the use of the path shown by arrow 77 as described above is unnecessarily complex. If it is known that the client and the server are in the same process, it is possible to shorten the invocation path, or flow path of a request for service. If a local process may be identified when an object reference is created, shortened flow paths, i.e. the paths represented by arrows 75 and 76, may be taken to send a request from a client to a server that are on the same host. The path represented by arrow 76 is more likely to be taken, as it uses subcontract layer 36 to identify an appropriate subcontract. However, in situations in which an appropriate subcontract does not need to be explicitly identified, the path represented by arrow 75 may be taken.

FIG. 1c will now be used to describe an embodiment of an object reference. As will be familiar to those skilled in the art, object references may take a variety of forms depending upon the location within the process that they are being held at any given time. However, by way of background, a representative object reference for use in a system that utilizes a low overhead implementation suite is illustrated in FIG. 1c. In the implementation shown therein, object reference 150 includes a host identifier 152, a port designation 154, and an object key 156. Object key 156 includes a subcontract identifier 158, a server identifier 160, an implementation identifier 162, and a user key 164. Host identifier 152 denotes a particular computer in a network, while port designation 154 identifies the port of the selected computer that is to be used for communication. Object key 156 provides further identifying information used in order to locate a desired servant object on its host machine.

Server identifier 160 names a particular process or program in which the servant object resides, while user key 164 is a unique number or string used to locate the servant within the process named by server identifier 160. Subcontract identifier 158 is used to attach the protocol of a particular subcontract and its associated services with a servant, and implementation identifier 162 names an implementation of an interface that is to be used with that servant object.

Finding and Downloading Java-Based Applications

An embodiment of the present invention provides a mechanism by which a requesting client may acquire the classes it needs within a distributed object system in order to run a particular applet. In one embodiment, this mechanism uses an object request broker (ORB) in order to communicate with one or more class servers that provide access to the class files needed. Thus, an ORB of a distributed object system is used to find the class files needed in a location independent manner. One advantage to using an ORB is that these class files and their associated class server may be located anywhere within the distributed object system yet may still be found by the client. Also, this mechanism allows a client a single point of access to the distributed object system in order to find the class files that it needs. And even though these class files may be in different locations, these class files are retrieved in a manner transparent to the requesting client. That is, the client knows a base class that it wishes to load, but is mercifully unaware of all the machinations behind the scenes required to find other classes used or needed by this base class. Also, a request from a client may pass from an ORB of one distributed object system to an ORB of another.

A wide variety of clients are contemplated that may benefit from being able to find and download executable code according to the present invention. By way of example, one particular client is a client running Java software that is enabled to communicate with an ORB and to download Java classes. Also, in a broad sense, an embodiment of the present invention is able to load any applet execution code. That is, applet execution code may be any execution code that can be downloaded and executed by a client. As used herein, the term "applet" refers to a body of executable program code, which code is effective to implement a function or facility when used in conjunction with a supporting execution environment. An "applet" may refer to a wide variety of types of execution code. By way of example, an applet may be a collection of byte codes representing classes that are executed by a remote interpreter, such as Java classes that are executed using a Java language interpreter. These byte codes may also be compiled before execution, or may even undergo a combination of interpretation/compilation before execution. The Java interpreter may reside inside a Web browser. And in particular, applet execution code may refer to code that represents an implementation of a Java class. And applet may mean in particular a small Java program that can be embedded in another application such as an HTML document in order to provide interactive, executable content on a Web page. A Java class may be defined as a collection of data and methods that operate on that data. Together, the data and methods describe the state and behavior of an object.

Figure 2:
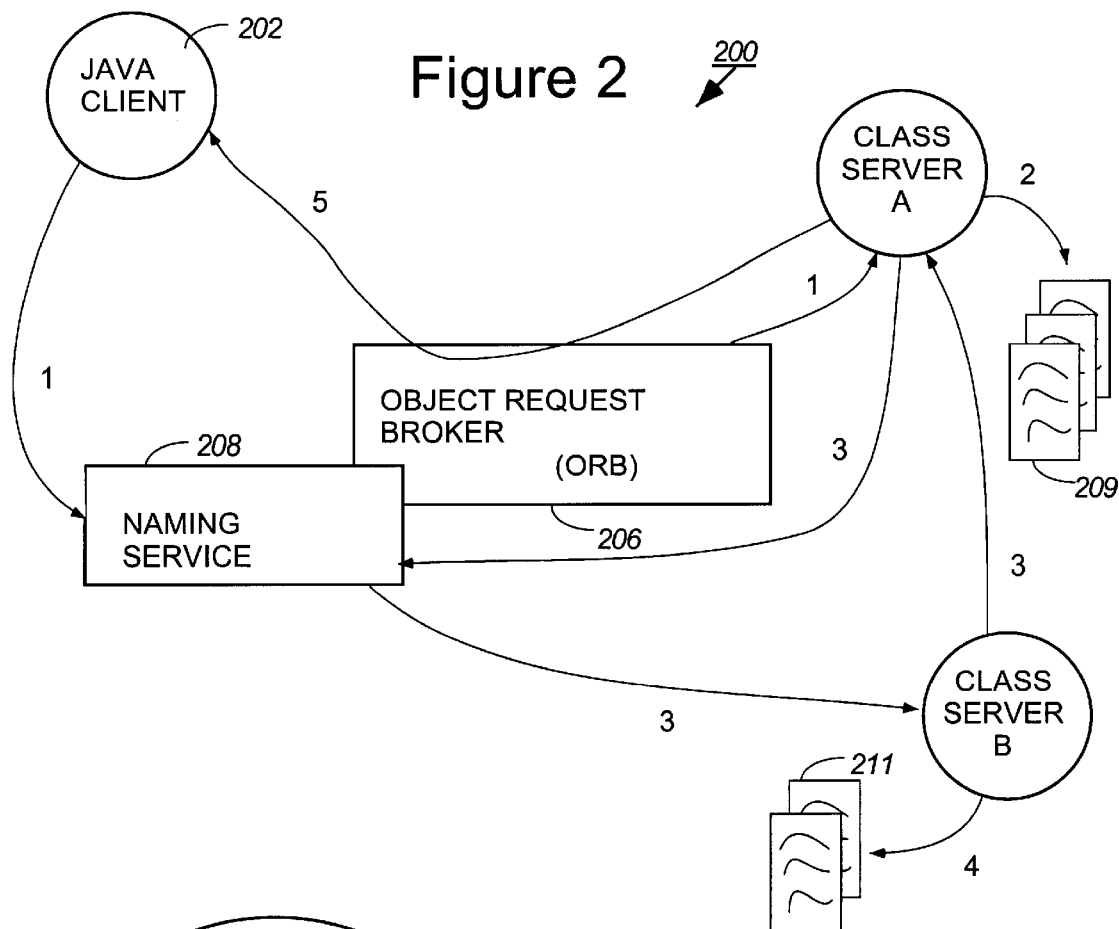
FIG. 2 shows a Java client using an object request broker in order to download Java class files from various class servers according to one embodiment of the present invention.
Figure 3:
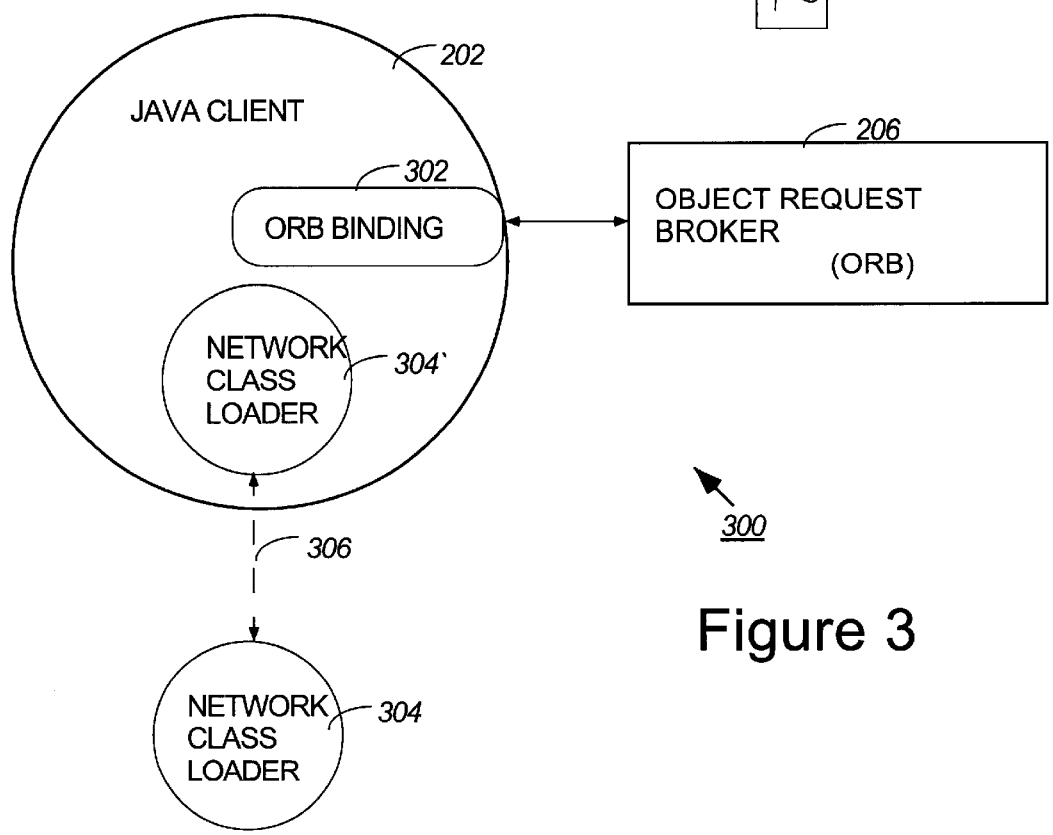
FIG. 3 shows in greater detail the Java client of FIG. 2 including modules that it uses to download Java classes according to one embodiment of the present invention.
Figure 4:
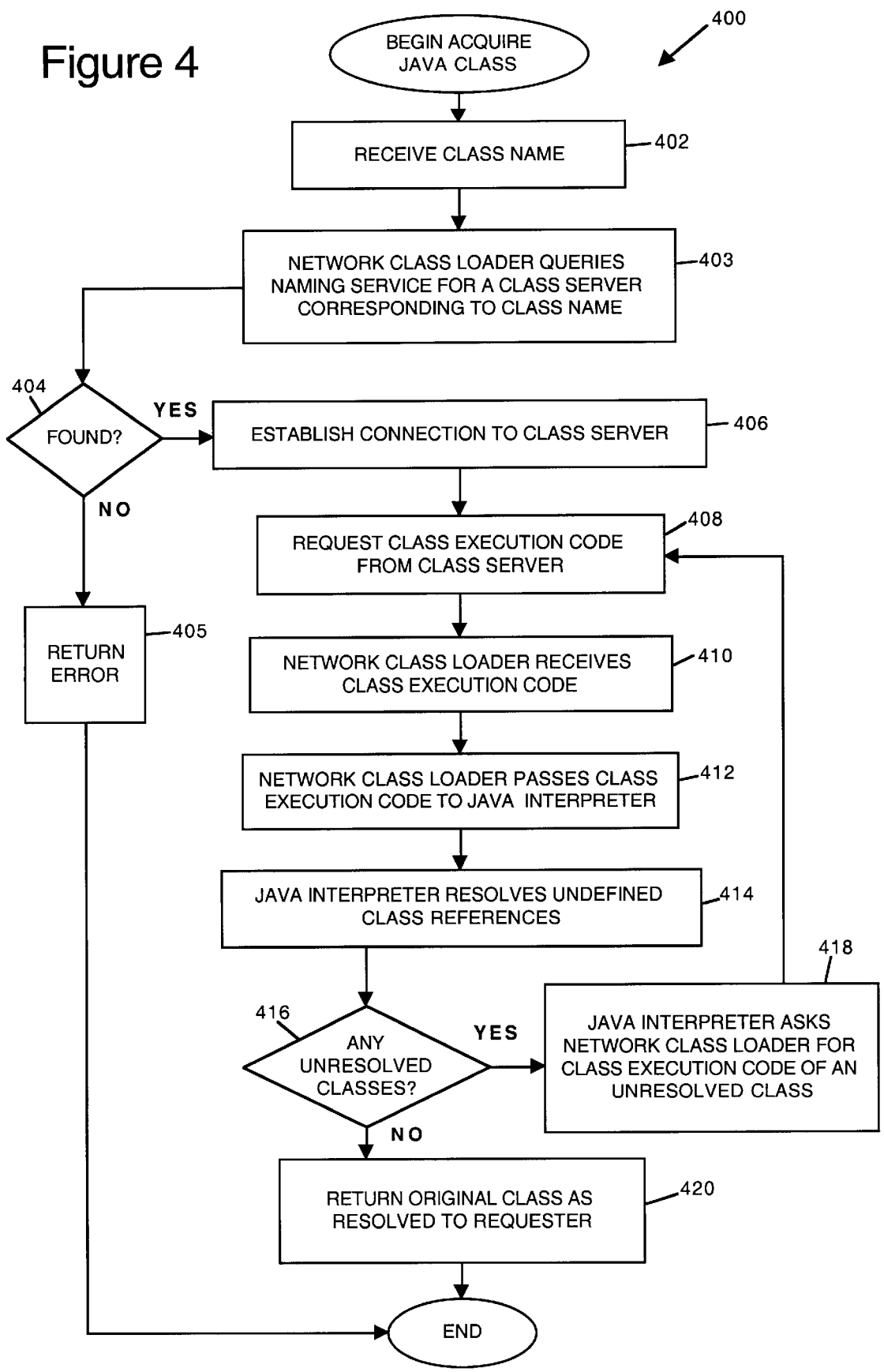
FIG. 4 is a flow chart for acquiring Java classes within a distributed object system according to one embodiment of the present invention.
Figure 5:
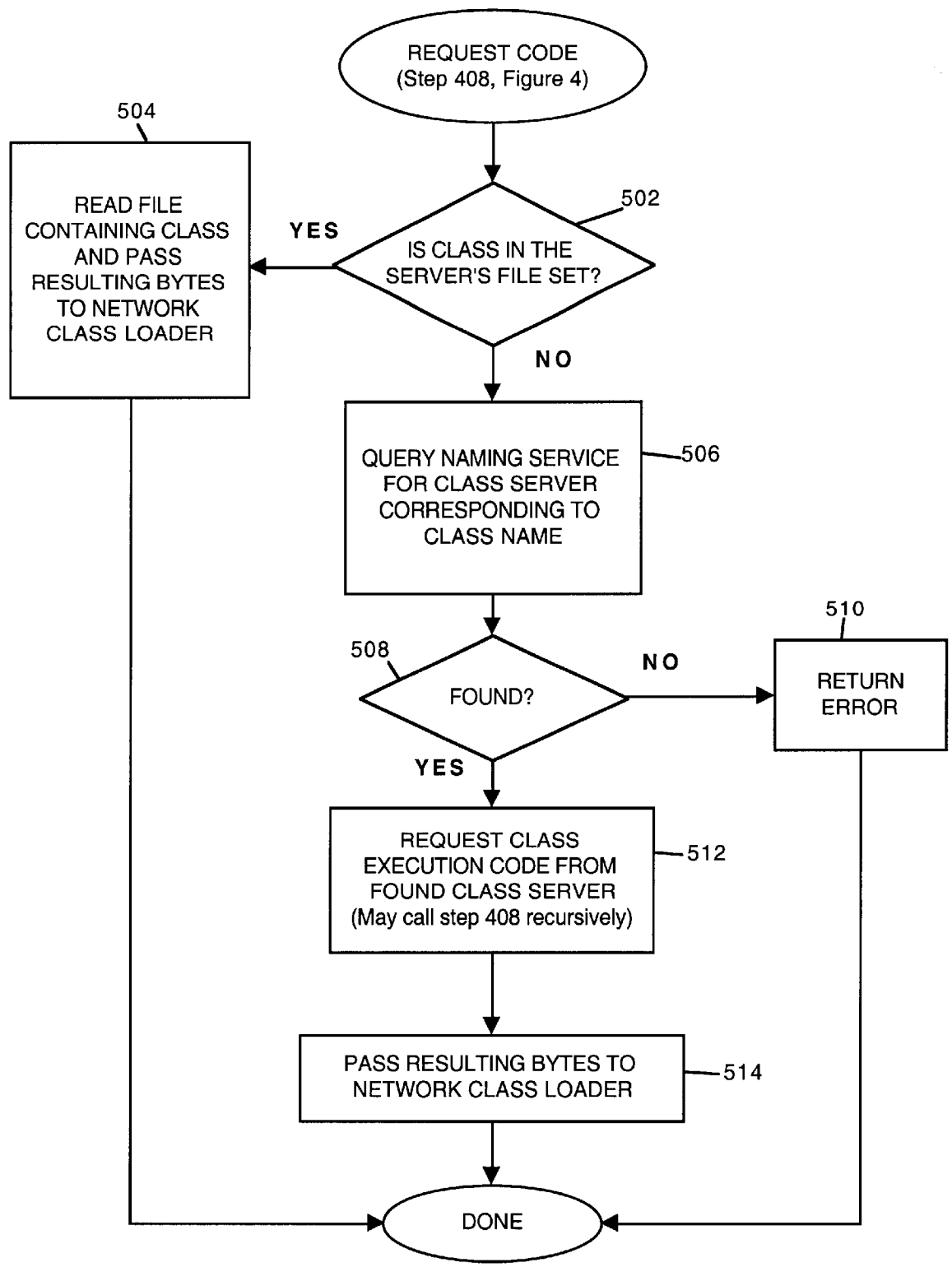
FIG. 5 is a flow chart showing the request code step of FIG. 4 in greater detail according to one embodiment of the present invention.

The present invention is useful and advantageous in many different scenarios. By way of example, an embodiment of the present invention is useful when a Java client wishes to query an object about what its presentation is. The presentation of a particular object may be used to run an executable program in a small window within a larger window. An object may be given the ability to give to the client its presentation, that is an implementation of the object's "front end" or interface. In this example, the presentation of an object is an applet that is represented as a location independent object. Thus, by way of an embodiment of the present invention, the Java client may use the ORB in order to find this location independent object wherever it may be within the distributed object system. Once found, the applet may be downloaded to the client by way of an embodiment of the present invention and executed within the client. The present invention may be applicable in many other situations that will be apparent from the description of the figures below. FIGS. 2 and 3 illustrate an embodiment of the present invention for use within a distributed object system, and FIGS. 4 and 5 show a flow chart for how the invention may be practiced according to one embodiment.

FIG. 2 illustrates graphically how in one embodiment of the invention a Java client 202 may communicate via a communication mechanism 206 in order to acquire Java class files 209 and 211 within a distributed object system 200. Java client 202 may be a Web browser incorporating a Java interpreter or may be any Java-enabled client that wishes to download an applet for use. A communication mechanism for allowing a Java client to communicate with remote class servers in order to find and download class files may be implemented in a wide variety of manners. By way of example, this communication mechanism may be implemented as an object request broker of a distributed object system. And in particular, this object request broker, or ORB, may be implemented as described above with reference to FIGS. 1a, 1b, and 1c. Class servers A and B are objects within the distributed object system that are implementations of a particular interface definition language (IDL). In other words, a class server may be defined by an IDL and may include a variety of operations and attributes defined upon it. Associated with each class server on the same machine are files containing Java classes. For example, class server A has an associated file set 209 and class server B has an associated file set 211. Thus, Java classes may be located on any machine within a distributed object system and are accessible by a Java client via their associated class server as will be explained in more detail below.

Also included within the distributed object system 200 is a naming service 208. The naming service 208 allows object names to be registered so that a client may determine the location of a particular object by reference to the naming service. In this way, objects may refer to other objects by name. A naming service may be implemented in a wide variety of manners. By way of example, the naming service may be one module of the Object Services layer of a distributed object system as defined under the OMG CORBA standard.

In one embodiment, the process by which a Java client acquires classes for an applet occurs as follows with reference to the circled numerals. Arrows (1) show how a Java client 202 may use the naming service 208 and the ORB 206 in order to determine a particular class server A that has access to a given class name that the client desires to be loaded. If this class name is contained within the file set 209 associated with class server A, then arrow (2) shows how class server A retrieves the file containing the class name from its file set 209. However, if this class name is not present in the associated file set 209, then arrows (3) illustrate graphically how class server A will itself utilize the naming service in order to determine a second class server B that does have access to the desired class name. Arrow (4) shows how this class server B will access its associated file set 211 in order to retrieve the executable program code corresponding to this class name. Arrow (5) shows how this class code corresponding to the class name desired by the Java client is finally returned via the ORB 206 to the Java client 202. It should be appreciated that the communication taking place as indicated by arrows (1), (3) and (5) is machine independent. That is, the code associated with a particular class name may be moved to a new machine or given a new name as long as the naming service is updated to indicate the new location or name. In this fashion, an embodiment of the present invention advantageously allows classes associated with an applet to be located anywhere within a distributed object system in a way that is transparent to the requesting client.

FIG. 3 shows in greater detail the Java client 202 and its implementation that allows it to communicate with the ORB and to download Java classes. Java client 202 may be a Web browser using a Java interpreter or any Java-enabled client. Simply by itself, Java client 202 with only a Java interpreter is not enabled to talk to a distributed object system through the use of an ORB 206. Thus, an ORB binding mechanism 302 is used to enable the Java client to communicate with a distributed object system through an ORB 206. In one embodiment, ORB binding 302 is a collection of Java classes that the Java client acquires in a conventional way such as through a URL address or through a local file system. The ORB binding 302 is a module loaded in to a Java interpreter that enables the Java client to talk to an interface definition language (IDL) and to make distributed object calls. In one sense, ORB binding 302 is a connector between a Java interpreter and an interface definition language. The Java client bootstraps itself to the ORB by loading in these classes and thus extending it capabilities. The ORB binding may be implemented in a variety of manners. By way of example, ORB binding 302 may be a software module that is described in pending U.S. patent applications with Ser. No. 08/534,966 filed Sep. 28, 1995, now U.S. Pat. No. 5,737,607, Ser. No. 08/539,999 filed Oct. 6, 1995, now U.S. Pat. No. 5,758,186, Ser. No. 08/540,129 filed Oct. 6, 1995, now U.S. Pat. No. 5,815,708, and Ser. No. 60/004,057 filed Sep. 20, 1995, which all are hereby incorporated by reference.

Once the Java client 202 has the capability to talk to an ORB 206 it also needs the capability to load and resolve classes available from the distributed object system. The network class loader 304 is a mechanism that allows a Java client to load and define new classes at run time. It also has functionality to allow classes to be resolved. If a downloaded class uses other classes that are not currently known or defined within the Java client, these other classes must be found and loaded ("resolved"). The network class loader 304 is called to acquire these needed classes. The network class loader also emits requests from the Java client in response to a client request for particular Java code. The network class loader is available within a computer network, and may be loaded or acquired by the Java client in a conventional way that a Java client acquires a class. For example, a call to a local file system or to a known URL address loads the network class loader 304. The network class loader 304 may be loaded into Java client 202 as shown by arrow 306 where it is then shown within the Java client as 304'. Once the ORB binding 302 and the network class loader 304' are present in Java client 202, the Java client is ready to acquire needed Java classes over a distributed object system.

FIG. 4 shows a flow chart 400 for acquiring a Java class needed by a particular client according to one embodiment of the present invention. For example, in the course of a particular client application, a distributed object has produced the name of a class needed to execute within a Java interpreter. The procedure shown in FIG. 4 uses a distributed object system according to one embodiment of the present invention in order to load this class and any other classes it uses. A wide variety of classes exist that may be desirable for loading into a client application. A class desired may depend upon the specific client application. By way of example, classes that implement a portion of a graphical user interface, so-called "panel classes", are suitable for acquiring through use of an embodiment of the present invention. These "panel classes" are especially suitable when the graphical user interface may vary based upon the nature of a distributed object that it is being used to manipulate.

When this acquire class procedure begins, the ORB binding and network class loader have already been loaded into the Java client as shown in FIG. 3. In a first step 402, the class name that is desired to be loaded is received. Next, the class server object located somewhere within the distributed object system that has access to the desired class name must be determined. Thus, in step 403, the network class loader (NCL) queries the naming service in order to determine the appropriate class server. This step is illustrated graphically in FIG. 2 by arrows (1). In step 404, if no class server is found that corresponds to the desired class name, an error is returned in step 405 and then the procedure ends. However, if a class server is found that corresponds to the desired class name, then in step 406 the ORB establishes a connection to this found class server.

Now that the class server has been found, the NCL requests the class execution code from the class server that corresponds to the desired class name in step 408. The execution for a particular class may be represented in a wide variety of manners. By way of example, this execution code may take the form of an array of bytes that are stored in a file or files. In step 408 the class server may obtain the necessary class files locally or it may need to request these files of another class server. This process will be described in greater below with reference to FIG. 5.

Once this execution code for class name has been retrieved, it is delivered to the network class loader within the Java client in step 410. Next, in step 412, the NCL passes this execution code to the Java interpreter. At this point, because the recently loaded class may use other classes, the Java interpreter must resolve any undefined class references. For example, if the retrieved execution code of the class indicates that other classes are used and these classes are not currently defined within the Java interpreter, then the execution code for these undefined class names must also be retrieved from class servers somewhere within the distributed object system. Step 416 tests whether there are any unresolved classes remaining within the Java interpreter. If not, this indicates that all execution code needed by the original class requested is present in the Java interpreter, and in step 420 this original class is returned to the requesting client as being resolved.

However, if there are one or more unresolved classes, then in step 418 the Java interpreter asks the NCL for the execution code of a first unresolved class. From step 418 the procedure loops back to step 408 in which the NCL requests from the class server the appropriate class execution code. In this fashion, this portion of FIG. 4 may loop through steps 408 to 418 until all execution code has been retrieved for all unresolved classes. Thus, it should be appreciated that by reference to an original class name, the client application is able to load and resolve all necessary classes for this original class over a distributed object network.

FIG. 5 explains in greater detail step 408 of FIG. 4 according to one embodiment. Because a class server may not be able to find a particular class within its own associated file set, it may be necessary to look elsewhere within the distributed object system for the class needed. In this fashion, an embodiment of the present invention is able to find Java classes anywhere within a distributed object system and in a manner transparent to the client. In this embodiment, the original class server found determines that it does not have local access to the class needed and is able to search for other class servers.

Initially, in step 502, the class server determines whether the desired class is present in the file set of the class server. If the class (and its corresponding execution code) is found in the server's file set, then in step 504 this file is read and the appropriate execution code is passed back to the NCL within the Java client. However, if the class is not in the server's file set then this class server must look elsewhere in order to find the class. In step 506 this first class server queries the naming service in order to find a class server that does correspond to the desired class name. In other words, the first class server is looking for another class server that has an associated file set that includes a file with the class name that is desired. Step 508 tests whether such a class server has been found. If not, then step 510 returns an appropriate error message and the procedure ends. However, if an appropriate class server is found, then in step 512 the execution code corresponding to the class name is requested from the found class server.

It should be appreciated that step 512 may be a recursive step. That is, when the execution code is requested from the found class server, it may be that this found class server does not have access to the class but may need to call the naming service itself in order to find an appropriate class server. This situation may occur if a class is moved from one class server to another. Once the execution code has been found and read from the appropriate file, then in step 514 the resulting bytes are passed back to the NCL within the Java client. After this step the procedure ends.

The present invention as described above employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should be remembered, however, that all of these and similar terms are to be associated with the appropriate physical quantities and are merely convenient labels applied to these quantities.

Further, the manipulations performed are often referred to in terms such as identifying, running, or comparing. In any of the operations described herein that form part of the present invention these operations are machine operations. Useful machines for performing the operations of the present invention include general purpose digital computers or other similar devices. In all cases, there should be borne in mind the distinction between the method of operations in operating a computer and the method of computation itself. The present invention relates to method steps for operating a computer in processing electrical or other physical signals to generate other desired physical signals.

The present invention also relates to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, the present invention further relates to computer readable media that include program instructions for performing various computer-implemented operations. The media and program instructions may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 6:
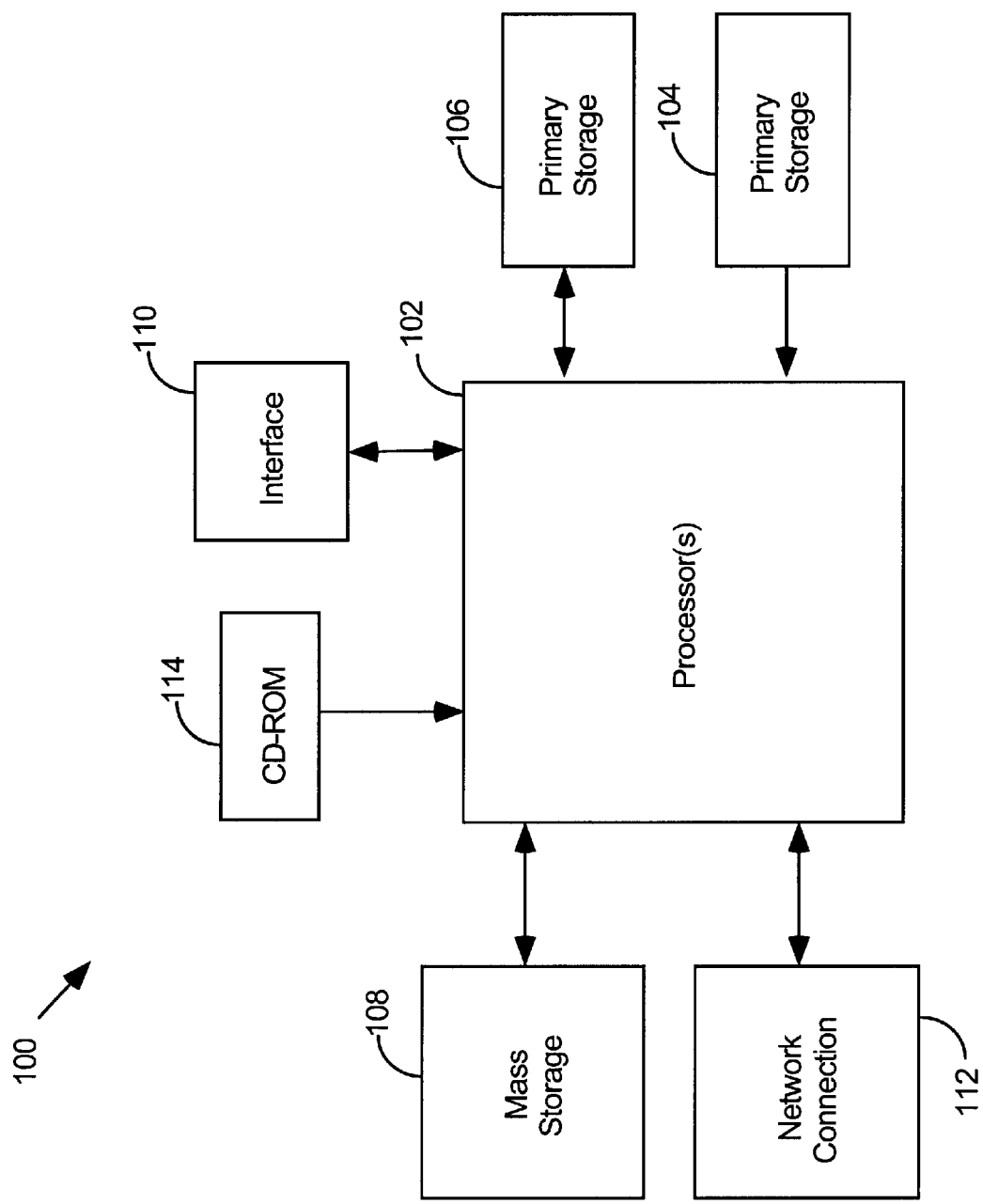
FIG. 6 shows a typical computer system suitable for implementing the present invention.

FIG. 6 illustrates a typical computer system in accordance with the present invention. The computer system 100 includes any number of processors 102 (also referred to as central processing units, or CPUs) that are coupled to storage devices including primary storage 106 (typically a random access memory, or RAM), primary storage 104 (typically a read only memory, or ROM). As is well known in the art, primary storage 104 acts to transfer data and instructions uni-directionally to the CPU and primary storage 106 is used typically to transfer data and instructions in a bi-directional manner. Both of these primary storage devices may include any suitable of the computer-readable media described above. A mass storage device 108 is also coupled bi-directionally to CPU 102 and provides additional data storage capacity and may include any of the computer-readable media described above. The mass storage device 108 may be used to store programs, data and the like and is typically a secondary storage medium such as a hard disk that is slower than primary storage. It will be appreciated that the information retained within the mass storage device 108, may, in appropriate cases, be incorporated in standard fashion as part of primary storage 106 as virtual memory. A specific mass storage device such as a CD-ROM 114 may also pass data uni-directionally to the CPU.

CPU 102 is also coupled to an interface 110 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 102 optionally may be coupled to a computer or telecommunications network using a network connection as shown generally at 112. With such a network connection, it is contemplated that the CPU might receive information from the network, or might output information to the network in the course of performing the above-described method steps. The above-described devices and materials will be familiar to those of skill in the computer hardware and software arts.

Although the foregoing invention has been described in some detail for purposes of clarity of understanding, it will be apparent that certain changes and modifications may be practiced within the scope of the appended claims. For instance, the communication mechanism used between the client and class server may be any suitable object request broker. Also, the naming service may be any module capable of identifying the location of a class name within a distributed object system. And the naming service may be part of an object request broker, or may be a separate module. In addition, although the classes have been described as being stored on computer files, they may be present within a computer system on any computer-readable media. And the present invention is capable of loading any appropriate portion of executable code, and not necessarily in units of classes. And although the above examples describe applet execution code as being in one form programs for the Java programming environment, it will be appreciated by those of skill in the art that the term applet execution code refers to any suitable information that may be downloaded in a manner transparent to a client and then executed by that client. Also, although the ORB binding and network class loader have been described as two separate modules, it is contemplated that they may form one unit that has the functionality to allow a Java client to communicate with an ORB and to download Java classes. Therefore, the described embodiments should be taken as illustrative and not restrictive, and the invention should not be limited to the details given herein but should be defined by the following claims and their full scope of equivalents.

I claim:

1. A computer apparatus for use in acquiring applet execution code within a distributed object computing system having clients and applet servers, said computer apparatus comprising:

a processing unit;

an input/output device coupled to said processing unit;

a storage device in communication with said processing unit;

an object request broker arranged to facilitate communication between said clients and said applet servers, said object request broker being further arranged to receive a request for applet execution code from a client enabled to receive said applet execution code;

a first applet server being arranged to retrieve said applet execution code in response to said request from said client and to return said applet execution code to said client; and a Java client with ORB binding software and network class loader software operating to allow said client to acquire said applet execution code without requiring said client to know the location of said applet execution code within said distribution object computing system.

2. A computer apparatus as recited in claim 1 wherein said object request broker is associated with a naming service arranged to receive a request from said client to identify said first applet server associated with said applet execution code.

3. A computer apparatus as recited in claim 2 wherein said first applet server is arranged to query said naming service to determine a second applet server to retrieve said applet execution code.

4. A computer apparatus as recited in claim 3 further comprising:

a mass storage unit in communication with said central processing unit, said mass storage unit including files containing said applet execution code, wherein said first applet server is further arranged to retrieve said applet execution code from said files.

5. In a distributed object computing system having clients, applet servers and an object request broker arranged to facilitate communication between said clients and said applet servers, a computer-implemented method of acquiring applet execution code within said distributed object computing system, comprising:

loading ORB binding software into a client to enable said client to pass requests for said applet execution code to said object request broker, wherein said applet execution code can be located anywhere within said distributed object computing system;

loading network class loader software into said client to enable said client to load and resolve portions of said applet execution code that are returned to said client from one of said applet servers, wherein execution code needed to resolve said portions of said applet execution code that are returned to said client can be located anywhere within said distributed object computing system;

querying said object request broker by said client to determine a first applet server to obtain said applet execution code;

requesting a portion of said applet execution code from said determined first applet server with said object request broker;

retrieving at least said portion of said applet execution code with said first applet server; and returning said portion of said applet execution code retrieved by said first applet server to said client with said object request broker, thereby allowing said client to acquire said applet execution code without requiring said client to know the location of said applet execution code within said distribution object computing system.

6. A method as recited in claim 5 wherein querying said object request broker includes querying a naming service of said distributed object computing system.

7. A method as recited in claim 6 wherein retrieving said portion of said applet execution code includes:

determining whether said portion of said applet execution code is within a file set associated with said first applet server;

reading a first file to retrieve said portion of said applet execution code when it is determined that said portion of said applet execution code is within a file set of said first applet server; and querying said naming service with said first applet server to determine a second applet server within said distributed object computing system that is associated with said portion of said applet execution code when it is determined that said portion of said applet execution code is not within a file set of said first applet server.

8. A method as recited in claim 7 wherein returning said portion of said applet execution code is performed by said second applet server first returning said portion of said applet execution code to said first applet server.

9. A method as recited in claim 7 wherein returning said portion of said applet execution code is performed by said second applet server returning said portion of said applet execution code directly to said client.

10. A method as recited in claim 7 wherein said portion of said applet execution code corresponds to a Java class.

11. A method as recited in claim 5 further comprising:

determining whether said portion of said applet execution code returned to said client by said applet server contains any unresolved references to said applet execution code; and requesting additional applet execution code corresponding to said unresolved reference from said first applet server through said object request broker when it is determined that said portion of said applet execution code contains an unresolved reference.

12. In a distributed object computing system having clients, applet servers and an object request broker arranged to facilitate communication between said clients and said applet servers, a computer-implemented method of acquiring applet execution code within said distributed object computing system comprising:

loading ORB binding software into a client to enable said client to pass requests for said applet execution code to said object request broker, wherein said applet execution code can be located anywhere within said distributed object computing system;

loading network class loader software into said client to enable said client to load and resolve portions of said applet execution code that are returned to said client from one of said applet servers, wherein execution code needed to resolve said portions of said applet execution code that are returned to said client can be located anywhere within said distributed object computing system;

querying a naming service of said distributed object computing system by said client to determine a first applet server to obtain said applet execution code;

requesting a portion of said applet execution code from said determined first applet server with said object request broker;

retrieving at least said portion of said applet execution code with said first applet server; and returning said portion of said applet execution code retrieved by said first applet server to said client with said object request broker, thereby allowing said client to acquire said applet execution code without requiring said client to know the location of said applet execution code within said distribution object computing system.

13. A method as recited in claim 12 wherein retrieving said portion of said applet execution code includes:

determining whether said portion of said applet execution code is within a file set associated with said first applet server;

reading a first file to retrieve said portion of said applet execution code when it is determined that said portion of said applet execution code is within a file set of said first applet server; and querying said naming service with said first applet server to determine a second applet server within said distributed object computing system that is associated with said portion of said applet execution code when it is determined that said portion of said applet execution code is not within a file set of said first applet server.

14. A method as recited in claim 13 wherein returning said portion of said applet execution code is performed by said second applet server first returning said portion of said applet execution code to said first applet server.

15. A method as recited in claim 13 wherein returning said portion of said applet execution code is performed by said second applet server returning said portion of said applet execution code directly to said client.

16. A method as recited in claim 13 wherein said portion of said applet execution code corresponds to a Java class.

17. In a distributed object computing system having clients, applet servers and an object request broker arranged to facilitate communication between said clients and said applet servers, a computer-implemented method of acquiring applet execution code within said distributed object computing system comprising:

querying said object request broker by a client using an ORB binding mechanism to determine a first applet server to obtain said applet execution code, wherein said applet execution code can be located anywhere within said distributed object computing system;

requesting a portion of said applet execution code from said determined first applet server with said object request broker;

retrieving at least said portion of said applet execution code with said first applet server; and returning said portion of said applet execution code retrieved by said first applet server to said client with said object request broker;

determining whether said portion of said applet execution code returned to said client by said applet server contains any unresolved references to said applet execution code;

requesting additional applet execution code corresponding to said unresolved reference from said first applet server through said object request broker when it is determined that said portion of said applet execution code corresponding to said unresolved reference contains an unresolved reference, said client resolving said unresolved reference by using a network class loader mechanism, said additional applet execution code corresponding to said unresolved reference can be located anywhere within said distributed object computing system; and wherein said client can acquire said applet execution code without said client having to know the location of said applet execution code within said distribution object computing system.

18. A computer program product comprising a computer-usable medium having computer-readable program code embodied thereon for acquiring applet execution code within a distributed object computing system, the distributed object computing system having clients, applet servers and an object request broker arranged to facilitate communication between said clients and said applet servers, the computer program product comprising computer-readable program code for effecting the following within the computer system:

loading ORB binding software into a client to enable said client to pass requests for said applet execution code to said object request broker, wherein said applet execution code can be located anywhere within said distributed object computing system;

loading network class loader software into said client to enable said client to load and resolve portions of said applet execution code that are returned to said client from one of said applet servers, wherein execution code needed to resolve said portions of said applet execution code that are returned to said client can be located anywhere within said distributed object computing system;

querying said object request broker by said client to determine a first applet server to obtain said applet execution code;

requesting a portion of said applet execution code from said determined first applet server with said object request broker;

retrieving at least said portion of said applet execution code with said first applet server; and returning said portion of said applet execution code retrieved by said first applet server to said client with said object request broker, thereby allowing said client to acquire said applet execution code without requiring said client to know the location of said applet execution code within said distribution object computing system.

19. A computer program product as recited in claim 18 wherein querying said object request broker includes querying a naming service of said distributed object computing system.

20. A computer program product as recited in claim 19 wherein retrieving said portion of said applet execution code includes program code for:

determining whether said portion of said applet execution code is within a file set associated with said first applet server;

reading a first file to retrieve said portion of said applet execution code when it is determined that said portion of said applet execution code is within a file set of said first applet server; and querying said naming service with said first applet server to determine a second applet server within said distributed object computing system that is associated with said portion of said applet execution code when it is determined that said portion of said applet execution code is not within a file set of said first applet server.

21. A computer program product as recited in claim 20 wherein returning said portion of said applet execution code is performed by said second applet server first returning said portion of said applet execution code to said first applet server.

22. A computer program product as recited in claim 20 wherein returning said portion of said applet execution code is performed by said second applet server returning said portion of said applet execution code directly to said client.

23. A computer program product as recited in claim 20 wherein said portion of said applet execution code corresponds to a Java class.

24. A computer program product as recited in claim 18 further comprising program code for effecting the following:

determining whether said portion of said applet execution code returned to said client by said applet server contains any unresolved references to said applet execution code; and requesting additional applet execution code corresponding to said unresolved reference from said first applet server through said object request broker when it is determined that said portion of said applet execution code contains an unresolved reference.

25. A computer program product comprising a computer-usable medium having computer-readable program code embodied thereon for acquiring applet execution code within a distributed object computing system, the distributed object computing system having clients, applet servers and an object request broker arranged to facilitate communication between said clients and said applet servers, the computer program product comprising computer-readable program code for effecting the following within the computer system:

loading ORB binding software into a client to enable said client to pass requests for said applet execution code to said object request broker, wherein said applet execution code can be located anywhere within said distributed object computing system;

loading network class loader software into said client to enable said client to load and resolve portions of said applet execution code that are returned to said client from one of said applet servers, wherein execution code needed to resolve said portions of said applet execution code that are returned to said client can be located anywhere within said distributed object computing system;

querying a naming service of said distributed object computing system by said client to determine a first applet server to obtain said applet execution code;

requesting a portion of said applet execution code from said determined first applet server with said object request broker;

retrieving at least said portion of said applet execution code with said first applet server; and returning said portion of said applet execution code retrieved by said first applet server to said client with said object request broker, thereby allowing said client to acquire said applet execution code without requiring said client to know the location of said applet execution code within said distribution object computing system.

26. A computer program product as recited in claim 25 wherein retrieving said portion of said applet execution code includes program code for:

determining whether said portion of said applet execution code is within a file set associated with said first applet server;

reading a first file to retrieve said portion of said applet execution code when it is determined that said portion of said applet execution code is within a file set of said first applet server; and querying said naming service with said first applet server to determine a second applet server within said distributed object computing system that is associated with said portion of said applet execution code when it is determined that said portion of said applet execution code is not within a file set of said first applet server.

27. A computer program product as recited in claim 26 wherein returning said portion of said applet execution code is performed by said second applet server first returning said portion of said applet execution code to said first applet server.

28. A computer program product as recited in claim 26 wherein returning said portion of said applet execution code is performed by said second applet server returning said portion of said applet execution code directly to said client.

29. A computer program product as recited in claim 26 wherein said portion of said applet execution code corresponds to a Java class.

30. A computer program product comprising a computer-usable medium having computer-readable program code embodied thereon for acquiring applet execution code within a distributed object computing system, the distributed object computing system having clients, applet servers and an object request broker arranged to facilitate communication between said clients and said applet servers, the computer program product comprising computer-readable program code for effecting the following within the computer system:

querying said object request broker by a client using ORB binding software to determine a first applet server to obtain said applet execution code, wherein said applet execution code can be located anywhere within said distributed object computing system;

requesting a portion of said applet execution code from said determined first applet server with said object request broker;

retrieving at least said portion of said applet execution code with said first applet server; and returning said portion of said applet execution code retrieved by said first applet server to said client with said object request broker;

determining whether said portion of said applet execution code returned to said client by said applet server contains any unresolved references to said applet execution code;

requesting additional applet execution code corresponding to said unresolved reference from said first applet server through said object request broker when it is determined that said portion of said applet execution code contains an unresolved reference, said client resolving said unresolved reference by using network class loader software, wherein additional applet execution code corresponding to said unresolved reference to said client can be located anywhere within said distributed object computing system; and wherein said client can acquire said applet execution code without requiring said client to know the location of said applet execution code within said distribution object computing system.

* * * * *